June 21, 1932.  J. S. KEEN ET AL  1,864,441
TRAILER TRUCK
Filed March 2, 1931   2 Sheets-Sheet 1
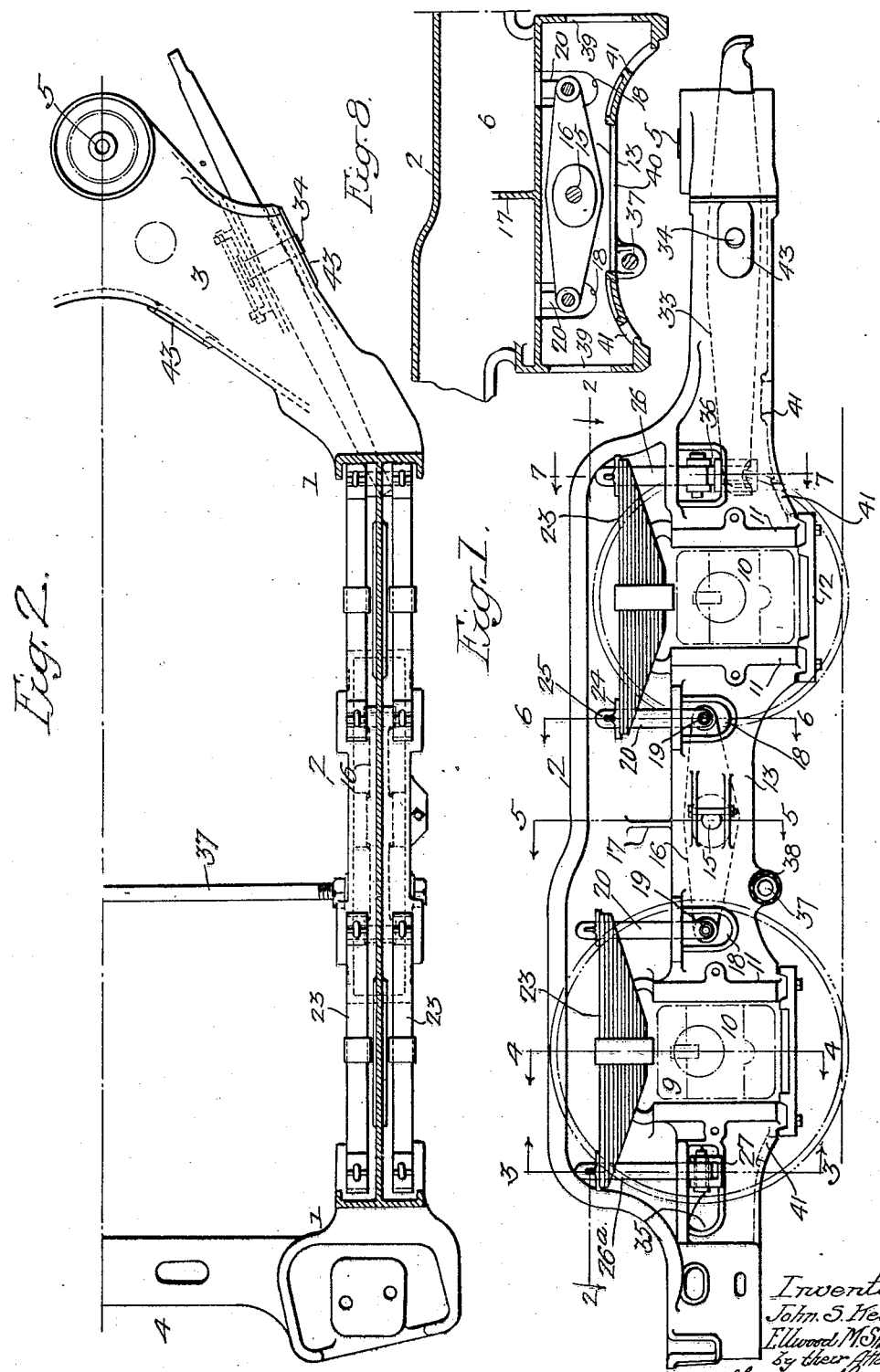

June 21, 1932. J. S. KEEN ET AL 1,864,441
TRAILER TRUCK
Filed March 2, 1931 2 Sheets-Sheet 2
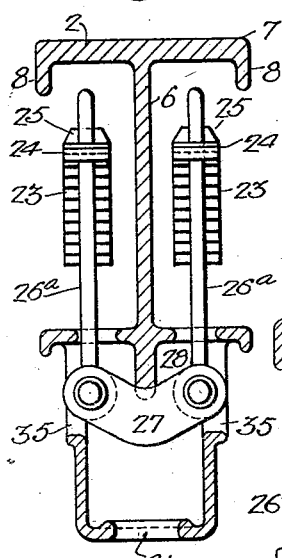
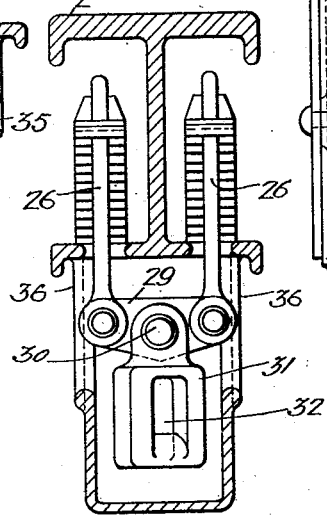
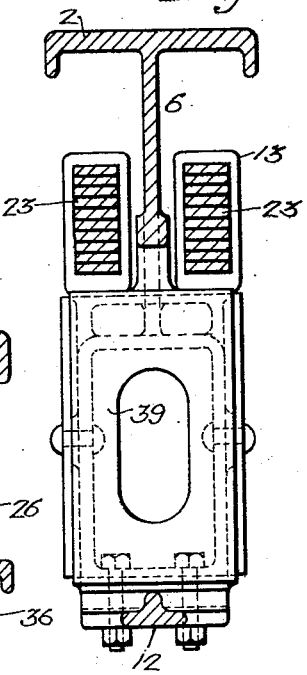
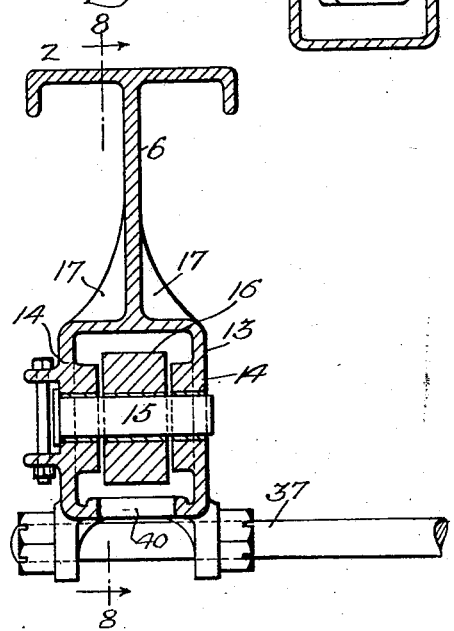
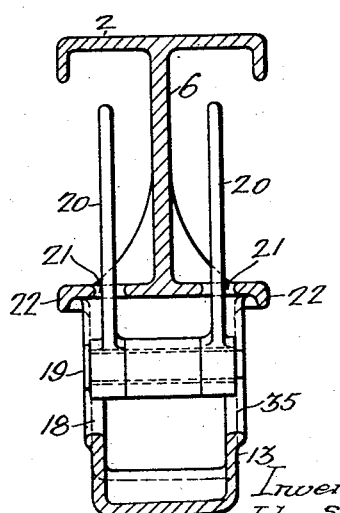

Patented June 21, 1932

1,864,441

UNITED STATES PATENT OFFICE

JOHN S. KEEN, OF PHILADELPHIA, AND ELLWOOD M. SHANNON, OF BALA, PENNSYLVANIA

TRAILER TRUCK

Application filed March 2, 1931. Serial No. 519,624.

The object of our invention is to improve the construction of trailer trucks by providing equalizing mechanism in which the springs are arranged in pairs over each box, and located under the cross-member of the T-frame of the truck, and to connect the springs by an equalizing beam located within the box portion of the truck. By this construction all the mechanism is protected, and the springs are readily inspected or replaced.

Referring to the drawings:

Fig. 1 is a side view of our improved trailer truck;

Fig 2 is a sectional plan view of one-half the truck on the line 2—2, Fig. 1;

Fig. 3 is a sectional view on the line 3—3, Fig. 1;

Fig. 4 is a sectional view on the line 4—4 Fig. 1;

Fig. 5 is a sectional view on the line 5—5, Fig. 1;

Fig. 6 is a sectional view on the line 6—6, Fig. 1 the spring and connection being omitted;

Fig. 7 is a sectional view on the line 7—7, Fig. 1; and

Fig. 8 is a sectional elevation on the line 8—8, Fig. 5.

1 is the body of the truck, consisting of members 2 at each side of the truck, and transverse members 3 and 4 at opposite ends of the truck, respectively. The members 3 and 4 are cast integral with the side members in the present instance, and the member 3 forms the radius bar of the truck. In this radius bar is an opening 5 for a pivot pin. The side members of the truck are T-shaped in cross-section, as shown in Figs. 3 and 4. The vertical webs 6 of the side members are located at the center of each side member and the top cross-members 7 of the T extend the full width of the side members and have downwardly turned flanges 8 which protect the springs and add strength to the structure. This T-frame construction extends substantially the full length of the truck and extends across the openings 9 for the boxes 10, shown by dotted lines in Fig. 1. On each side of each opening is an integral pedestal 11 of the usual construction. The pedestals are connected by a cross-piece 12, which extends under the box 10.

The lower portion of the center of the frame is in the form of a box 13, shown clearly in Figs. 5 and 8 and in the box portion of the frame are the bearings 14 for the fulcrum pin 15 of the equalizing beam 16, which is located in the box.

Extending from the T-member 6 of the frame to the outside of the box member 13 are bracing ribs 17. In the frame opposite the ends of the equalizing beam 16 are cored openings 18, which are of sufficient size to allow the pins 19 to be inserted, which connect the ends of the equalizing beams to the links 20. There are two of these links 20, which extend through openings 21 in the upper portion 22 of the box and extend on each side of the vertical webs 6.

Semi-elliptical springs 23 rest on the boxes 10. These springs are arranged in pairs, springs of each pair being on opposite sides of the webs 6, as shown in Fig. 4, and the links 20 extend through slots in the inner end of each spring and through cap plates 24, and have keys 25. Attached to the outer ends of each spring are links 26—26ª respectively, the links 26ª being pivotally connected to a rocker 27, which rests on the depending portion 28 at one end of the frame. The links 26 at the opposite end of the frame are connected to a transverse equalizer 29 pivoted at 30 to a block 31, having an opening 32 therein, Fig. 7, into which extends one end of an equalizing beam 33, fulcrumed at 34 to the member 3 of the frame, and the outer end of this equalizing beam 33 is shaped to engage a member of the main equalizing mechanism of the locomotive.

In the frame opposite the rocker 27 are cored openings 35 and opposite the equalizer 29 are cored openings 36, to allow for the insertion of the rocker and equalizer and the connecting pins. It will be understood that this mechanism above described is duplicated on the opposite side of the truck.

Extending from one side of the truck to the other, substantially midway between the ends thereof, is a cross-bar 37. This bar extends through lugs 38 cast integral with the truck frame and provides lateral stiffness for the truck. While we have shown one transverse bar 37, it will be understood that two or more bars may be used if found desirable.

At each end of the central box-like structure 13 are cored openings 39. In the bottom of the structure is an opening 40, which allows the equalizing lever 16 to be placed in position. The several openings lighten the structure.

A number of cored openings 41 are formed in the bottom member of the truck, and elongated openings 42 are formed in the transverse member 3 of the truck, so that access may be had to the pivot of the equalizing beam 33.

We claim:

1. The combination in a locomotive trailer truck, of an integral truck frame having side members, and transverse members connecting the side members; pedestals for the axle boxes, said pedestals forming part of the side members of the truck, each side member being T-shaped in cross section and having a centrally located box; a central equalizing beam pivotally mounted in said box; two pairs of semi-elliptical springs arranged to rest on the axle boxes; links connecting one end of each spring to the central equalizing beam; an end equalizing beam arranged to be connected to the main equalizing mechanism of the locomotive; links connecting said end equalizing beam to the ends of the forward springs; and links connecting the rear ends of the other semi-elliptical springs to the frame of the truck.

2. A locomotive trailer truck frame, made as an integral casting, consisting of two side members, and a transverse connecting member at one end thereof, the side members of the truck having a central web and a top member extending beyond the web and forming a T-shaped structure, and having a central box-like portion between the pedestals of the frame.

3. A locomotive trailer truck frame, made as an integral casting, consisting of two side members and transverse connecting members, the side members of the truck having a central web and a top member extending beyond the web and forming a T-shaped structure, and having a central box-like portion between the pedestals of the frame, said box-like structure having openings at the sides, ends and bottom thereof.

4. A locomotive trailer truck frame having side members and a transverse member at the forward end thereof, said transverse member having a pivot pin opening; two sets of pedestals formed on the frame; a connecting central box-like structure between the pedestals of the frame; a vertical web extending over the box-like structure and beyond the pedestals; and a T-shaped member extending beyond each side of the web and forming recesses for the semi-elliptical spring of the equalizing mechanism.

5. The combination in a locomotive trailer truck, of a frame having side members and connecting transverse members, each side member having axle box openings, spaced apart, and having a central box member located between the axle box openings, and having a vertical web extending above the box-like structure and the axle box openings; a top member forming with the vertical web a T-shaped beam, said top member being curved downwards at each end and united with the main portion of the truck; a central equalizing beam pivotally mounted within the box-like structure; two pairs of semi-elliptical springs arranged to rest upon the axle boxes of the truck, one spring of each pair being located on one side of the vertical web and the other spring of each pair being located on the other side of the vertical web; a link connecting each spring of each pair with the equalizing beam; links connecting the forward end of the forward springs to a second equalizing beam; a rocker engaging the frame of the truck; and links connecting the rocker with the rear end of the rear springs.

6. A locomotive trailer truck frame consisting of integral side members and transverse connecting members, each side member having two pairs of pedestals spaced apart; a box-like structure between the pedestals; end box-like structures beyond the pedestals; a vertical web extending longitudinally over the pedestals and the box-like structures; and a top member forming with the web a T-shaped beam, said top member arranged to extend over the springs of equalizing mechanism.

7. The combination in a locomotive trailer truck, of an integral frame, having side members and transverse connecting members, said frame having two pairs of pedestals for the axle boxes of the truck, the frame having a box-like structure between the axle box openings, and a vertical web extending over the box-like structure and axle box openings; a top member forming with the vertical member a T-shaped reinforcing member; an equalizing beam mounted in the box-like structure; two pairs of semi-elliptical springs, one spring of each pair being located on one side of the vertical member and the other spring of each pair being located on the opposite side of the vertical member; links connecting the springs with the ends of the equalizing beam, a forward equalizer; forward links connecting the forward end of the forward springs with said equalizer; a block pivotally suspended from the equalizer and a second equalizing beam engaging the said block and pivoted to the forward transverse member; a rocker pivotally mounted in the rear end of the frame; and links connecting the rocker with the rear ends of the rear springs.

8. The combination in a locomotive trailer truck, of an integral frame having side members and a transverse connecting member at one end, said frame having two pairs of pedestals for the axle boxes of the truck, the frame having a box-like structure between the axle box openings and a vertical web extending over the box-like structure and pedestal openings; a top member forming with the vertical member a T-shaped reinforcing member; an equalizing beam pivotally mounted in the box-like structure; two pairs of semi-elliptical springs, one spring of each pair being located on one side of the vertical member and the other spring of each pair being located on the opposite side of the vertical member; links connecting the springs with the ends of the equalizing beam; a transverse equalizer; forward links connecting the forward end of the forward springs to said transverse equalizer; a block pivotally suspended from the equalizer and a second equalizing beam engaging the said block and pivoted to the forward transverse member; a rocker pivotally mounted in the rear end of the frame; and links connecting the rocker with the rear ends of the rear springs, the box-like structure having openings at each side, so that access may be had to the pivot pins connecting the links with the central equalizing beam, and having an opening in the bottom for the removal or replacement of the equalizing beam.

9. A truck frame made as an integral casting, having side members and transverse connecting members, each side member having axle box openings spaced apart; a box-like structure located between the axle box openings for the reception of an equalizing beam; a vertical web extending over the box-like structure and over the axle box openings; and bracing ribs extending on each side of the web, and from the web to the outer portions of the box-like structure.

10. The combination in a locomotive trailer truck, of a frame having side members and transverse cross members made as an integral casting, each side member having axle-box openings spaced apart and having a box-like structure between said openings for a central equalizing beam; a vertical web extending over the box-like structure and over the axle-box openings; a top member forming with the vertical web a T-like structure, the ends of the top member having downwardly extending flanges; an equalizing beam pivotally mounted within the box-like structure; two pairs of semi-elliptical springs arranged to rest upon the boxes of the truck, one spring of each pair being mounted on one side of the vertical web and the other spring of each pair being located on the opposite side of the said vertical web; links connecting the springs with the central equalizing beam and a second equalizing beam at the forward end of the truck, a transverse equalizer; a block suspended from the equalizer engaged by the second equalizing beam; links connecting the equalizer with the forward ends of the springs; a rocker at the rear end of the truck bearing upon the frame; and links connecting the said rocker with the rear end of the rear springs, said frame having openings therein so that access may be had to the pivot pins of the central equalizing beam and to the transverse equalizer and the rocker.

JOHN S. KEEN.
ELLWOOD M. SHANNON.